US007174023B2

(12) United States Patent
Ozawa

(10) Patent No.: US 7,174,023 B2
(45) Date of Patent: Feb. 6, 2007

(54) AUTOMATIC WIND NOISE REDUCTION CIRCUIT AND AUTOMATIC WIND NOISE REDUCTION METHOD

(75) Inventor: Kazuhiko Ozawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 182 days.

(21) Appl. No.: 10/525,112

(22) PCT Filed: Aug. 19, 2003

(86) PCT No.: PCT/JP03/10453

§ 371 (c)(1),
(2), (4) Date: Feb. 18, 2005

(87) PCT Pub. No.: WO2004/019654

PCT Pub. Date: Mar. 4, 2004

(65) Prior Publication Data

US 2005/0238183 A1 Oct. 27, 2005

(30) Foreign Application Priority Data

Aug. 20, 2002 (JP) ............................ 2002-238831

(51) Int. Cl.
*H04B 15/00* (2006.01)

(52) U.S. Cl. .................... 381/94.1; 381/94.2; 381/94.7

(58) Field of Classification Search ............... 381/94.1, 381/94.7, 94.2, 71.4, 71.13, 71.14, 317, 94.3; 367/901
See application file for complete search history.

(56) References Cited

U.S. PATENT DOCUMENTS 4,420,655 A * 12/1983 Suzuki ...................... 381/94.9
5,602,962 A * 2/1997 Kellermann ................ 704/226
5,917,921 A * 6/1999 Sasaki et al. .............. 381/94.1
5,982,906 A * 11/1999 Ono .......................... 381/94.2
6,859,420 B1 * 2/2005 Coney et al. ............... 367/178

FOREIGN PATENT DOCUMENTS

| | | |
|---|---|---|
| JP | 7-274280 | 10/1995 |
| JP | 2002-204493 | 7/2002 |
| JP | 2002-236500 | 8/2002 |
| JP | 2002-540696 | 11/2002 |

* cited by examiner

*Primary Examiner*—Vivian Chin
*Assistant Examiner*—Jason Kurr
(74) *Attorney, Agent, or Firm*—Frommer Lawrence & Haug LLP; William S. Frommer

(57) ABSTRACT

An object is to provide an automatic wind noise reducing circuit and an automatic wind noise reducing method, which are capable of coping with a multichanneling trend of audio signals, and improving performance as well as the degree of freedom in system design. Arithmetic units (26, 27, 28) obtain added signals of audio signals of audio channels excluding respective selected audio channels, which are selected so as to be different from each other. Arithmetic units (29, 30, 31) subtract respective added signals of the arithmetic units (26, 27, 28) from corresponding audio signals of the selected audio channels. The subtraction signals from the arithmetic units (29, 30, 31) are subjected to a band limit control and limited to a frequency band of a wind noise signal by LPFs (21, 23, 25). After level-controlling of the subtraction signals from the arithmetic units (29, 30, 31) which are limited to the wind noise signal band by variable level amplifiers (32, 33, 34), the subtraction signals are subtracted from respective audio signals of corresponding audio channels.

10 Claims, 5 Drawing Sheets

AUTOMATIC WIND NOISE REDUCTION CIRCUIT AND AUTOMATIC WIND NOISE REDUCTION METHOD

TECHNICAL FIELD

The present invention relates to an automatic wind noise reducing circuit for reducing a wind noise of an audio signal to be processed in an audio signal processing apparatus such as a digital video camera or the like and a method thereof.

BACKGROUND ART

In a VTR of a type integrated with a camera such as a digital video camera or the like, it is typically practiced that audio sounds are gathered using a plurality of built-in microphones which are disposed at an arbitrary distance therebetween, and they are recorded as a stereophonic sound signal of two channels of L (left channel) and R (right channel) in a recording medium via a directivity calculation circuit.

Further, in an outdoor image shooting using the VTR of a type integrated with a camera, in most cases of conventional imaging, a wind noise due to a wind sound is inevitably collected together with an audio signal, which makes it very disturbing and irritating to listen thereto. However, a system for reducing such a disturbing wind noise has been provided in Japanese Patent Application Publications H11-69480 and 2001-186585, in which wind noise reduction circuits are proposed. In the wind noise reduction circuits, only wind noise signals are automatically reduced by use of circuits from a mixture of an audio signal and a wind sound signal gathered via microphones.

However, because their wind noise reducing circuits according to these methods disclosed in the Japanese Patent Application Publications H11-69480 and 2001-186585 are configured on the premise that the audio signals thereof are to be recorded as a stereophonic audio signals of 2 channels of L and R, they cannot deal with a recording of audio signals having 3 or more channels.

In other words, even in the case where three or more microphone capsules (microphone) are used, its wind noise reducing processing is carried out always after producing audio signals of two channels via a directivity calculation circuit such as for a stereophonic sound field processing or the like. Therefore, according to conventional wind noise reducing circuits, inmost cases, there has been a restriction that such a wind noise reducing circuit must be inserted in the subsequent stage of the above-mentioned directivity calculation circuit such as a circuit for the stereophonic sound field processing or the like, thereby preventing to achieve an advantage that can be enjoyed by inserting the wind noise reducing circuit in the preceding stage of the directivity calculation circuit in order to improve the performance and the freedom of system design.

Further, because the recording formats of the currently available digital videos can process up to 4 channels of multichannel recording, and because a camera-integrated VTR employing a multichannel recording such as a recent MPEG/AAC (Advanced Audio Coding), Dolby digital, DTS (Digital Theater System) systems is expected to be introduced, the provision of an automatic wind noise reducing circuit capable of dealing with the multichannel recording of the audio signals is desirable.

In consideration of the above, an object of the present invention is to provide an automatic wind noise reducing circuit and a method therefor, which are capable of solving the above-mentioned problems, dealing with multi-channeled audio signals, and improving its performance and freedom of system design.

DISCLOSURE OF THE INVENTION

In order to solve the aforementioned problem, an automatic wind noise reducing circuit according to an invention described in claim 1 is characterized by including:

N number of audio channels (N is an integer equal to or greater than two);

first adder means for adding all of audio signals of N−1 number of audio channels, excluding one audio channel which is to be selected from the N number of audio channels;

first subtracting means for subtracting an added signal of the first adder means from an audio signal of the selected one of the audio channels, which is not added in the first adder means;

first extracting means for extracting a frequency band component of a wind noise signal with respect to each of the audio signals of the N number of audio channels in a preceding stage of the first adder means and the first subtracting means, or with respect to an output signal from the first subtracting means in a subsequent stage of the first subtracting means;

first gain control means for controlling a gain of an output signal from the first subtracting means, whose output signal is band-limited by the first extraction means; and second subtracting means for subtracting a signal, whose gain is controlled by the first gain control means, from the audio signal of the selected one of the audio channels, wherein an output signal from the second subtracting means is set as an audio output of the selected one of the audio channels.

According to the automatic wind noise reducing circuit of the invention described claim 1, by the first adder means, the added signal of audio signals with respect to audio channels except for an audio channel which is to be selected in advance is obtained. Furthermore, by the first subtracting means, the subtraction signal is obtained by subtracting the added signal of the first adder means from the audio signal of the selected audio channel.

The subtraction signal is subjected to the band limit control in the preceding stage of the first adder means and the first subtracting means, or in the subsequent stage of the first subtracting means in such a way that the subtraction signal becomes a signal of a band component of the wind noise signal. The subtraction signal from the first subtracting means the band thereof being limited is subjected to a gain control by a first gain limiter means. The subtraction signal subjected to a gain control is subtracted from the audio signal of the audio channel selected (containing wind noise signal whose band is not limited), thereby setting an audio signal after the subtraction as an output signal of the selected audio channel.

Accordingly, it is possible to cancel only a wind noise component from the audio signal of any audio channel to be selected which contains the wind noise signal so as to obtain an audio signal from which the wind noise signal is effectively reduced. Further, by providing an automatic wind noise reducing circuit having the configuration described above in a target audio channel among a plurality of audio channels, it is enabled to effectively reduce a wind noise component from the audio signal of the target audio channel.

Furthermore, an automatic wind noise reducing circuit according to an invention described in claim 2 is, in the automatic wind noise reducing circuit described in claim 1, characterized by including:

N sets of the first adder means, the first subtracting means, the first extracting means, the first gain control means and the second subtracting means, the N sets being provided corresponding to the N number of audio channels, wherein the selected one of the audio channels in each set is arranged so as not to overlap to each other.

According to the automatic wind noise reducing circuit according to the invention described in claim 2, it is arrange in such a way that each of the N number of audio channels is provided with the automatic wind noise reducing circuit, and that from each of the audio signals of the N number of audio channels, a respective wind noise signal is reduced.

In other words, because it is operable to reduce the wind noise signal for each audio signal of each audio channel, it can cope with, needless to mention two channels, but also with a multichannel of three or more channels.

Furthermore, an automatic wind noise reducing circuit according to an invention described in claim 3 is, in the automatic wind noise reducing circuit described in claim 1 or 2, characterized by further including:

third subtracting means for obtaining a differential audio signal between arbitrary audio signals among audio signals of the N number of audio channels;

second extracting means for extracting a frequency band component of a wind noise signal from the differential audio signal from the third subtracting means; and detector means, to which an extraction signal from the second extracting means is supplied, for generating a level detecting signal of the wind noise signal, wherein a gain of the first gain control means is variably controlled on the basis of the level detection signal from the detector means.

According to the automatic wind noise reducing circuit described in claim 3, it is arranged in such a way that the level detecting signal corresponding to an actual level of the wind noise signal is obtained from the differential audio signal between arbitrary audio signals among the audio signals of the N number of audio channels, thereby controlling the gain in the first gain control means on the basis of the level detecting signal.

Accordingly, because it is enabled to control the level of the subtraction signal from the first subtraction circuit for canceling the wind noise signal in accordance with the actual level of the wind noise signal contained in the audio signal, it is possible to effectively cancel the wind noise signal contained in the audio signal in accordance with the actual level thereof.

Furthermore, an automatic wind noise reducing circuit according to an invention described in claim 4 is, in the automatic wind noise reducing circuit described in claim 2 or 3, characterized by further including:

second adder means for adding all of output signals from the N sets of second subtracting means;

third extracting means, to which a signal from the second adder means is supplied, for extracting a frequency band component of the wind noise signal;

second gain control means for controlling a gain of an output signal from the third extracting means; and N sets of fourth subtracting means for subtracting an output signal of the second gain control means from respective output signals of the N sets of second subtracting means, wherein output signals from the N sets of fourth subtracting means are set as audio signals of the N number of audio channels, respectively.

According to the automatic wind noise reducing circuit of the invention described in claim 4, the output signals from the N sets of second subtracting means are added in the second adder means and limited of their frequency bands to the band components of their wind signals in the second extracting means, and further subjected to the gain control in the second gain control means. The gain-controlled signal is subtracted in the fourth subtracting means from respective output signal of the N sets of second subtracting means in such a way that N number of audio signals corresponding to the N number of audio channels are obtained in which even residual components of the wind noise signals are canceled.

Accordingly, it is enabled to effectively further reduce the residual wind noise components remaining in the audio signal in which the wind noise was reduced, thereby enabling to output a desired audio signal free from the disturbing wind noise signal.

Furthermore, an automatic wind noise reducing circuit according to an invention described in claim 5 is the automatic wind noise reducing circuit described in claim 4, characterized in that:

a gain of the second gain control means is variably controlled on the basis of the level detecting signal from the detector means.

According to the automatic wind noise reducing circuit of the invention described in claim 5, it is arranged such that in the second gain control means, the gain of an input signal is controlled on the basis of the level detecting signal from the detector means.

Accordingly, because the level of a signal for use in canceling the wind noise signal can be controlled in accordance with the actual level of the wind noise signal contained in the audio signal, it is ensured to effectively eliminate the wind noise signal which may still remain in the audio signal.

BEST MODE FOR CARRYING OUT THE INVENTION

By referring to the accompanying drawings, an automatic wind noise reducing circuit and an automatic wind noise reducing method according to a present invention is described. First, in order to make the overall description easier, a frequency characteristic of a wind noise signal in a typical video camera (VTR of a type integrated with a camera), and an example of a conventional L/R two-channel wind noise reducing circuit are described.

Frequency Characteristics of Wind Noise Signals

Figure 4:
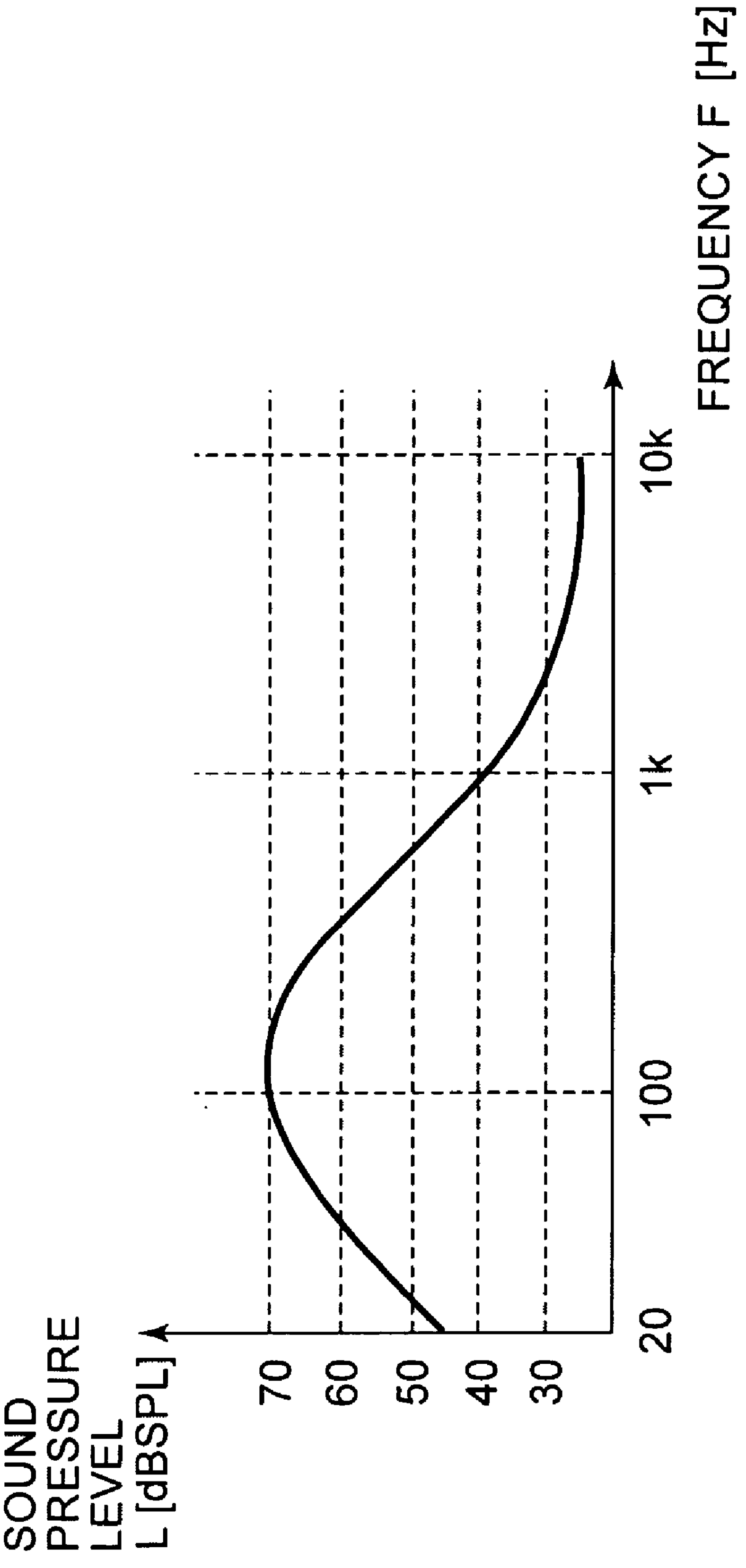
FIG. 4 is a diagram showing a frequency characteristic of a wind noise signal collected by microphones mounted on a video camera.

FIG. 4 is a diagram showing an example of frequency characteristics of wind noise signals to be collected typically by a video camera. As shown in FIG. 4, a level of the wind noise signal increases following 1/F characteristics (where F is a frequency) from approximately 1 kHz toward the lower frequencies.

However, because the level thereof decreases in an extremely low frequency depending on the characteristics of microphone units to be used or due to the influence of a coupling capacitance in an analog circuit for processing the audio signal, it has a peak point in the vicinity of approximately 200 Hz. Further, because the wind noise signal is caused by a vortex air stream which occurs in the vicinity of a microphone, respective wind noise signals from respective microphones are random signals having no correlation therebetween as compared with respective sound signals therefrom.

Two-channel Wind Noise Reducing Circuit

Figure 5:
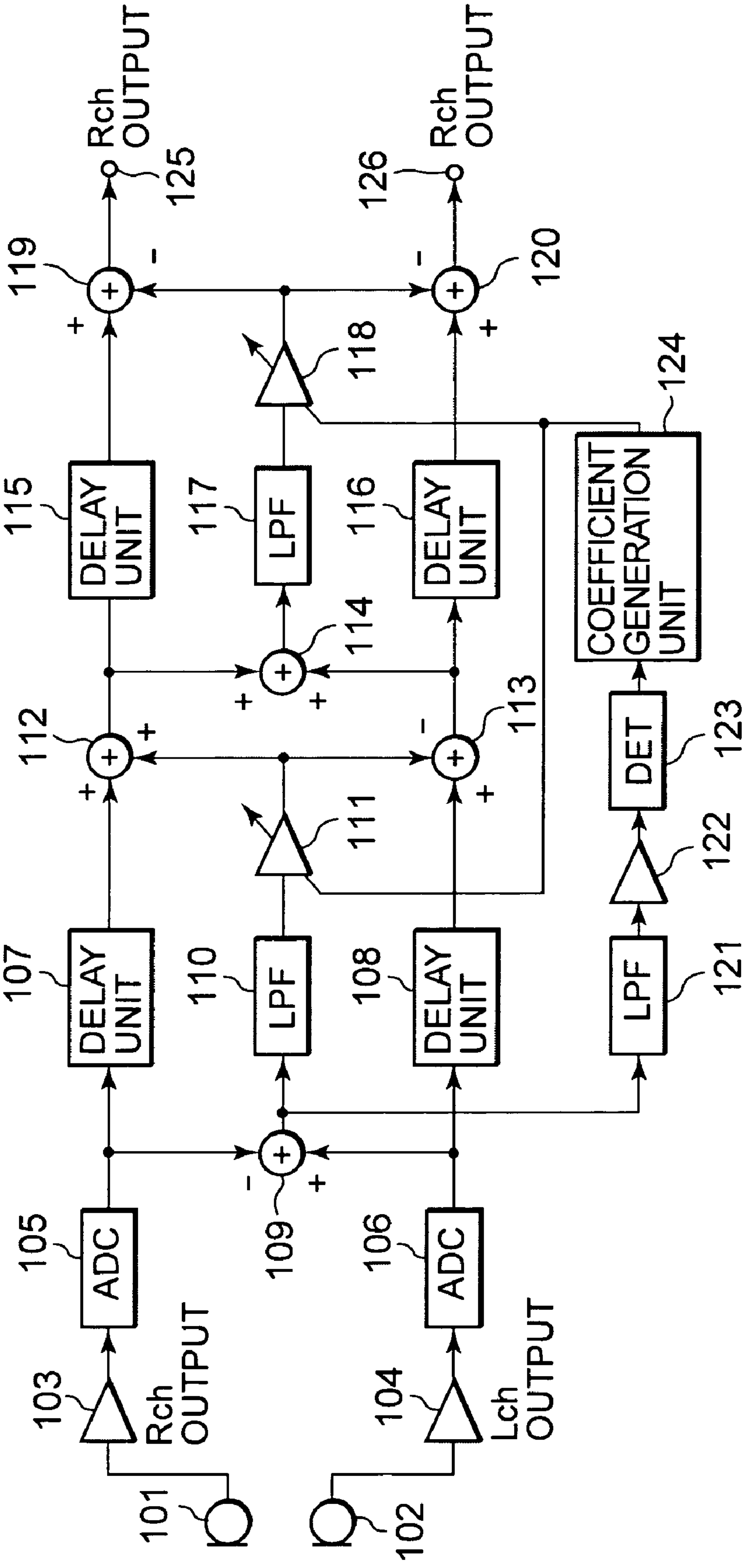
FIG. 5 is a diagram showing an example of a conventional two-channel automatic wind noise reducing circuit.

Next, a conventional L/R two-channel wind noise reducing circuit for reducing a wind noise signal having the aforementioned characteristics is described. FIG. 5 is a block diagram showing a conventional L/R two-channel wind noise reducing circuit.

Audio signals of Rch (right channel) and Lch (left channel) collected by microphones 101, 102 are supplied, via respective amplifiers 103, 104, to ADCs (Analog to Digital Converter) 105, 106, in which the audio signals are converted from analog to digital and become a digital signal.

The audio signal at Rch side which was converted to a digital signal in ADC 105 is supplied to a delay unit 107 and to a "−" (minus) terminal of an arithmetic unit 109, while the audio signal at Lch side which was converted to a digital signal in ADC 106 is supplied to a delay unit 108 and to a "+" (plus) terminal of the arithmetic unit 109. In the arithmetic unit 109, a differential component (L−R) signal between the Rch audio signal and the Lch audio signal is computed and supplied to LPFs (Low-Pass Filter) 110 and 121, respectively.

As described above, because there is no correlation between the wind noise signals of the L and the R channels, it is possible to extract almost all of the wind noise signals in the differential component (L−R) signal by allowing them to pass through only the wind noise band shown in FIG. 4 in the LPF 110. Further, by allowing an extremely low frequency thereof to pass through the LPF 121, only a wind noise signal which contains almost no audio signal can be extracted.

Further, an output from LPF 121 is amplified in an amplifier 122, and the wind noise signal thereof is subjected to a level detection in a DET (detection processor unit) 123. A level detection output from DET 123 is supplied to a coefficient generator unit 124. The coefficient generator unit 124 generates a wind noise level detecting signal as a control coefficient for a subsequent stage by shaping the level detection output from the DET 123, and supplies this to variable level amplifiers 111 and 118.

Further, an output from the LPF 110 is subjected to a level control in a variable level amplifier 111 in accordance with the wind noise level detecting signal supplied from the coefficient generator unit 124. In this instance, the variable level amplifier 11 is controlled such that if a wind noise is large, that is, if a level of the wind noise level detecting signal is large, its output becomes large, and contrarily if there is no wind noise, i.e. if the level of the wind noise level detecting signal becomes zero, it is controlled such that its output becomes zero.

Further, as shown in FIG. 5, the output signal from this variable level amplifier 111 is added to a delayed signal from the delay unit 107 in the arithmetic unit 112, and subtracted from a delayed signal from the delay unit 108 in the arithmetic unit 113.

The meaning of the arithmetic operations in these arithmetic units 112 and 113 is described. Let an audio signal of Lch be Ls, a wind signal of Lch be Lw, an audio signal of Rch be Rs and a wind signal of Rch be Rw, and if the wind noise is maximal, if an output/input ratio of the variable level amplifier 111 is set to be 0.5 times, an output Ra of the arithmetic unit 112 and an output La of the arithmetic unit 113 can be expressed by the following equations (1) and (2), respectively.

$$Ra=(Rs+Rw)+0.5(Lw-Rw)=Rs+0.5(Lw+Rw) \quad (1)$$

$$La=(Ls+Lw)-0.5(Lw-Rw)=Ls+0.5(Lw+Rw) \quad (2)$$

In other words, if the wind noise signals Rw and Lw are large, both the wind noise signals become monaural signals having noise components of (Lw+Rw), and if the wind noise signals Rw and Lw are zero, audio signals Rs and Ls are output, respectively. In comparison with the audio signals, because the wind noise signals have no correlation between respective channels, they can be reduced greatly by adding operation. Further, the delay units 107 and 108, which compensate for a delay component due to LPF 110 on the side of a main line, function to adjust timing in the arithmetic units 112, 113, thereby further improving the reduction effect.

Further, outputs of the arithmetic units 112, 113 are inputted to delay units 115, 116, respectively, and to an arithmetic unit 114 to be added therein, and an output therefrom is supplied to LPF a 117. Likewise the LPF 110, the LPF 117 is set at a frequency band of the wind noise for extraction thereof.

An output from the LPF 117 is subjected to a level control in the variable level amplifier 118 on the basis of a wind noise level detecting signal from the coefficient generation unit 124 such that if the wind noise is large, i.e. if the level of the wind noise level detecting signal is large, it is controlled to become large while in contrast if there is no wind noise, the level of the wind noise level detecting signal being zero, its output is controlled to become zero. The output from the variable level amplifier 118 is subtracted from the signal having passed through the delay unit 115 in arithmetic unit 119, and from the signal having passed through the delay unit 116 in arithmetic unit 120.

The meaning of the arithmetic operation in these arithmetic units 119, 120 is described. Using the aforementioned equations (1) and (2), further if the wind noise is maximal, if an output/input ratio of the variable level amplifier 118 is set to be 0.5 times, an output Rb of the arithmetic unit 119 and an output Lb of the arithmetic unit 120 can be expressed by the following equations (3) and (4), respectively, $$Rb=Rs+0.5(Lw+Rw)-0.5(Lw+Rw)=Rs \quad (3)$$

$$Lb=Ls+0.5(Lw+Rw)-0.5(Lw+Rw)=Ls \quad (4).$$

Therefore, the wind noise signals Rw and Lw are canceled so that only the audio signals Rs and Ls are obtained. Further, the delay units 115 and 116, which compensate for delayed components due to LPF 117 on the main line, function to adjust signal timing in arithmetic units 119 and 120, thereby further improving the noise reduction effect. Therefore, the output signals from the arithmetic units 119 and 120 become an audio signal in which the wind noise signal has been reduced as described above. And in the case of a video camera, it is inputted into a signal processor of a recording system and recorded in a recording medium such as a tape or the like together with an image signal supplied from an imaging signal system thereof.

Multichannel Automatic Wind Noise Reducing Circuit and a Method Thereof

In the case of the L/R two-channel wind noise reducing circuit, as described hereinabove, it is enabled to effectively reduce the wind noise in accordance with the level of the wind noise signal because the audio channel thereof is based on the premise of using the L/R two-channels. However, in case of a multichannel having audio channels of three or more, the wind noise reduction processing thereof could not have been executed until they were converted into two-channels. Accordingly, improvements in the performance and the freedom in the system design cannot be attained.

According to an automatic wind noise reducing circuit and an automatic wind noise reducing method according to a present invention to be described in the following, even in the case of a multichannel having three or more channels, advantageously, it is enabled to effectively reduce only a wind noise signal from a composite signal including an audio signal and a wind noise signal in each channel without the need of converting them into audio signals of the L/R two-channels. In the following description, it is described by way of example of audio signals of three-channels.

Figure 1:
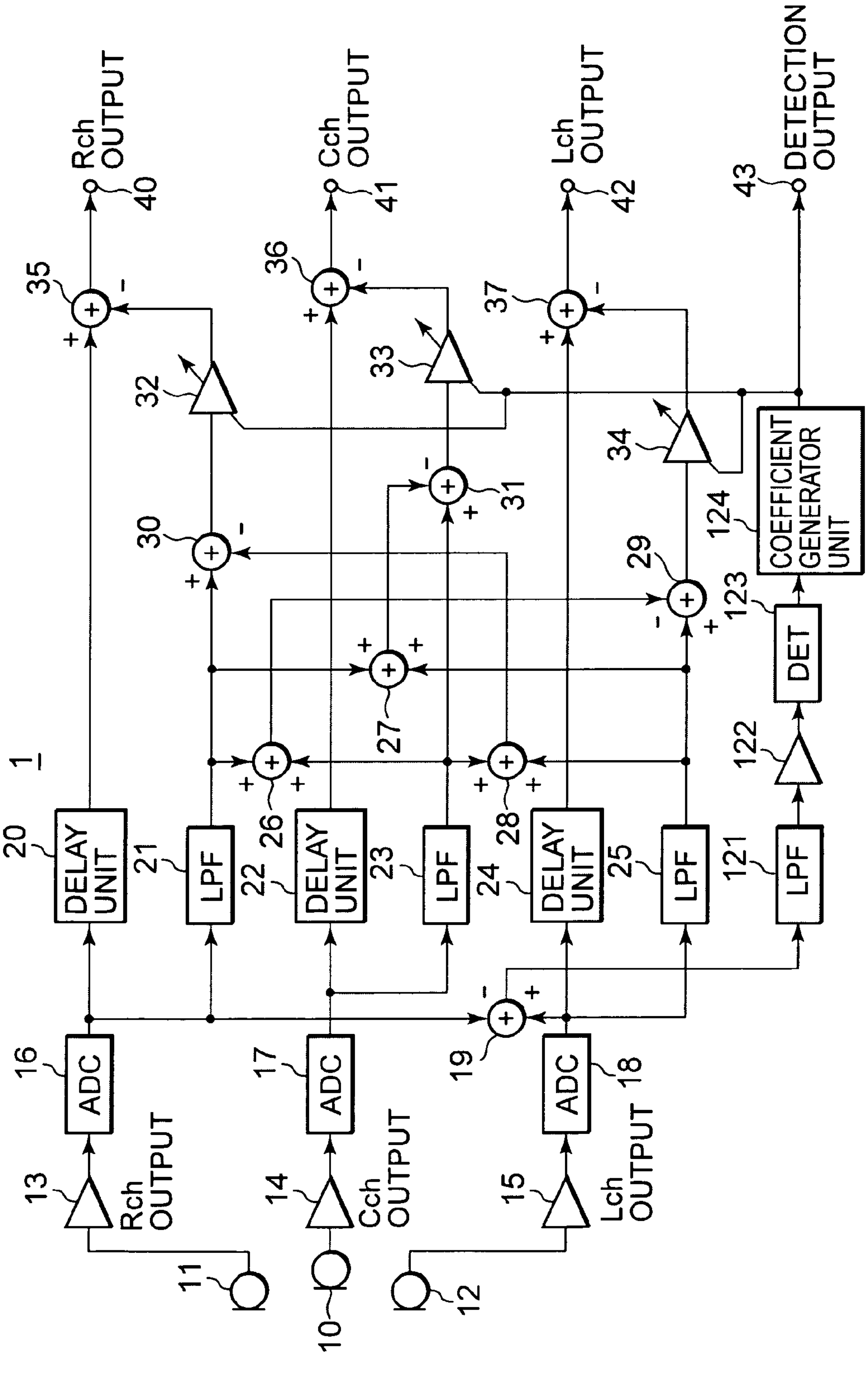
FIG. 1 is a diagram showing embodiments of an automatic wind noise reducing circuit and an automatic wind noise reducing method according to the invention.

FIG. 1 is a block diagram showing an automatic wind noise reducing circuit 1 capable of coping with a multichannel configuration, embodying the automatic wind noise reducing circuit and the automatic wind noise reducing method according to a present invention. As shown in FIG. 1, the automatic wind noise reducing circuit 1 according to this is of a type capable of coping with three-channels and independently processing respective audio signals gathered by three microphones 10, 11 and 12.

An audio signal of Rch (right channel) collected by a microphone 11, an audio signal of Cch (central channel) collected by a microphone 10 and an audio signal of Lch (left channel) collected by a microphone 12 are supplied via respective corresponding amplifiers 13, 14, 15 to respective ADCs 16, 17 and 18 corresponding thereto. Each of the ADCs 16, 17 and 18 converts a respective analog signal from the respective corresponding amplifiers 13, 14 and 15 into a digital signal.

Further, a digital audio signal R of Rch from ADC 16 is supplied to a delay unit 20, a LPF 21 and to a minus terminal of an arithmetic unit 19. A digital audio signal C of Cch from ADC 17 is supplied to a delay unit 22 and a LPF 23. And a digital audio signal L of Lch from ADC 18 is supplied to a delay unit 24, a LPF 25 and to a plus terminal of the arithmetic unit 19.

In the arithmetic unit 19, the digital audio signal R of Rch supplied to the minus terminal thereof is subtracted from the digital audio signal L of Lch supplied to the plus terminal thereof, and an output signal, i.e. a (L−R) signal, therefrom is supplied to a LPF 121, and while going through an amplifier 122, a detector DET 123 and a coefficient generator unit 124, a wind noise level detecting signal is generated. A method of generating this wind noise level detecting signal is similar to that indicated by the portions labeled with the same numerals showing the two-channel wind noise reducing circuit in FIG. 5.

Further, a digital audio signal of Rch (wind noise signal of Rch) Rw limited to the wind noise band shown in FIG. 4 in the LPF 21 is supplied to a plus terminal of arithmetic unit 30, one of plus terminals of arithmetic unit 26 and one of plus terminals of arithmetic unit 27. Further, a digital audio signal of Cch (wind noise signal of Cch) Cw limited to the wind noise band shown in FIG. 4 in LPF 23 is supplied to a plus terminal of arithmetic unit 31, the other plus terminal of arithmetic unit 26 and one of plus terminals of arithmetic unit 28. Further, a digital audio signal of Lch (wind noise signal of Lch) Lw limited to the wind noise band shown in FIG. 4 in LPF 25 is supplied to a plus terminal of arithmetic unit 29, the other plus terminal of arithmetic unit 28 and the other plus terminal of arithmetic unit 27.

Still further, a (Rw+Cw) signal from arithmetic unit 26, which is an added signal of the wind noise signal Rw of Rch and the wind noise signal Cw of Cch, is supplied to a minus terminal of arithmetic unit 29 for subtracting from the wind noise signal Lw of Lch supplied to the plus terminal of arithmetic unit 29, thereby being supplied as a (Lw−Rw−Cw) signal to a variable level amplifier 34.

Likewise, a (Rw+Lw) signal from arithmetic unit 27, which is an added signal of the wind noise signal Rw of Rch and the wind noise signal Lw of Lch, is inputted to a minus terminal of arithmetic unit 31 to be subtracted from the wind noise signal Cw of Cch supplied to a plus terminal of arithmetic unit 31, consequently to be supplied as a (Cw−Rw−Lw) signal to variable level amplifier 33.

Further, a (Lw+Cw) signal from arithmetic unit 28, which is an added signal of the wind noise signal Lw of Lch and the wind noise signal Cw of Cch, is inputted to a minus terminal of arithmetic unit 30 for subtracting from the wind noise signal Rw of Rch supplied to the plus terminal thereof, consequently to be supplied as a (Rw−Lw−Cw) signal to variable level amplifier 32.

Further, each of the variable level amplifiers 32, 33 and 34 is subjected to a level control in response to the wind noise level detecting signal supplied from the coefficient generator 124 so that if the wind noise is large, i.e. if a level of the wind noise level detecting signal is high, its output is controlled to become large, while in contrast, if there is no wind noise, the level of the wind noise signal level detecting signal becomes zero and its output is controlled to become zero.

Further, respective output signals from variable level amplifiers 32, 33, 34 are inputted to respective minus terminals of arithmetic units 35, 36, 37 to be subtracted from respective digital audio signals R, C, L supplied to respective plus terminals thereof from respective corresponding delay units 20, 22, 24, then respective output signals therefrom are outputted as a Rch signal, a Cch signal and a Lch signal from respective corresponding terminals 40, 41 and 42. Furthermore, the wind noise level detecting signal is outputted as a detector output from terminal 43.

Here, an operation of the automatic wind noise reducing circuit 1 according to this embodiment shown in FIG. 1 is described. In this section, let an audio signal of Lch be Ls, an wind noise signal thereof be Lw, an audio signal of Rch be Rs, a wind noise signal thereof be Rw, an audio signal of Cch be Cs, a wind noise signal thereof be Cw, and if the wind noise is maximal, let an output/input ratio of respective variable level amplifiers 32, 33, 34 be set at 0.5 times, and further, let respective output signals of Rch, Cch, Lch signals from output terminals 40, 41, 42 be represented by Ra, Ca and La, respectively. Accordingly, each of Ra, Ca and La can be expressed by the following equations (5), (6) and (7).

$$Ra=(Rs+Rw)-0.5(Rw-Lw-Cw)=Rs+0.5(Rw+Lw+Cw) \quad (5)$$

$$Ca=(Cs+Cw)-0.5(Cw-Rw-Lw)=Cs+0.5(Rw+Lw+Cw) \quad (6)$$

$$La=(Ls+Lw)-0.5(Lw-Rw-Cw)=Ls+0.5(Rw+Lw+Cw) \quad (7).$$

In other words, if the wind noise is large, respective wind noise signals in respective outputs consequently have (Rw+Lw+Cw) components, and become a monaural signal which is obtained by adding up all the wind noise signals in all the channels. Therefore, these wind noise signals which have no correlation across their channels in comparison with the audio signals can be substantially reduced by converting them into the adding-up format. Further, if there is no wind noise, with Rw, Cw and Lw becoming zero, audio signals Rs, Cs and Ls are outputted, respectively.

Still further, because respective delay units 20, 22, 24 compensate for delay components due to LPFs 21, 23, 25 on the side of the main line, they function to adjust signal timings in arithmetic units 35, 36, 37 and further to improve the reduction effect. Furthermore, the LPFs 21, 23, 25 the pass band of which are limited to the wind noise band shown in FIG. 4 can extract almost all of the wind noise signals, in addition, by the provision of the LPF 121 which allows an extremely low frequency to pass through, only the wind noise signal which does not contain any audio signal can be extracted.

In the generation of the wind noise level detecting signal in FIG. 1, the (L−R) signal from arithmetic unit 19 is utilized, however, it is not limited thereto, and in the case where differential components of three-channels are to be used, a (C−R) signal or a (L−C) signal may be used, otherwise, a maximal value among combinations of these differential components may be selected as well.

As described hereinabove, according to the automatic wind noise reducing circuit shown in FIG. 1, there are provided respective automatic wind noise reducing circuits for respective audio channels. In other words, as shown also in FIG. 1, for the Rch, there is provided an automatic wind noise reducing circuit including: an arithmetic unit 28 (first adder means); an arithmetic unit 30 (first subtracting means); a variable level amplifier 32 (first gain control means); and an arithmetic unit 35 (second subtracting means). For the Cch, there is provided an automatic wind noise reducing circuit including: an arithmetic unit 27 (first adder means); an arithmetic unit 31 (first subtracting means); a variable level amplifier 33 (first gain control means); and an arithmetic unit 36 (second subtracting means).

Further, for the Lch, there is provided an automatic wind noise reducing circuit including: an arithmetic unit 26 (first adder means); an arithmetic unit 29 (first subtracting means); a variable level amplifier 34 (first gain control means); and an arithmetic unit 37 (second subtracting means). Still further, each of the LPFs 21, 23, 25 provided therein corresponds to each of the first extracting means.

As described hereinabove, by providing respective automatic wind noise reducing circuits corresponding to respective audio channels, it is enabled to reduce the wind noise signals mixed in audio sounds in respective audio channels irrespective of the number of the audio channels.

It is not limited to the case where a plurality of automatic wind noise reducing circuits are provided respectively for a plurality of audio channels. Alternatively, the automatic wind noise reducing circuit may be provided only for a particular audio channel selected, for example, only for the Lch (left channel) and the Rch (right channel) or the like.

As described above, by installing a limited number of the automatic wind noise reducing circuits only in such audio channels which tend to easily gather a wind noise signal, it is ensured to be able to construct an audio signal processing system having reduced the wind noise signal at a reduced cost.

However, in the case of the automatic wind noise reducing circuit 1 shown in FIG. 1, as can be understood from the above-mentioned equations (5), (6) and (7), there still remain residual components of the wind noise signal. Accordingly, by installing an additional automatic wind noise reducing circuit for elimination of the residual wind noise components in the subsequent stage of the automatic wind noise reducing circuit 1 shown in FIG. 1, the residual wind noise signal can be further reduced.

Figure 2:
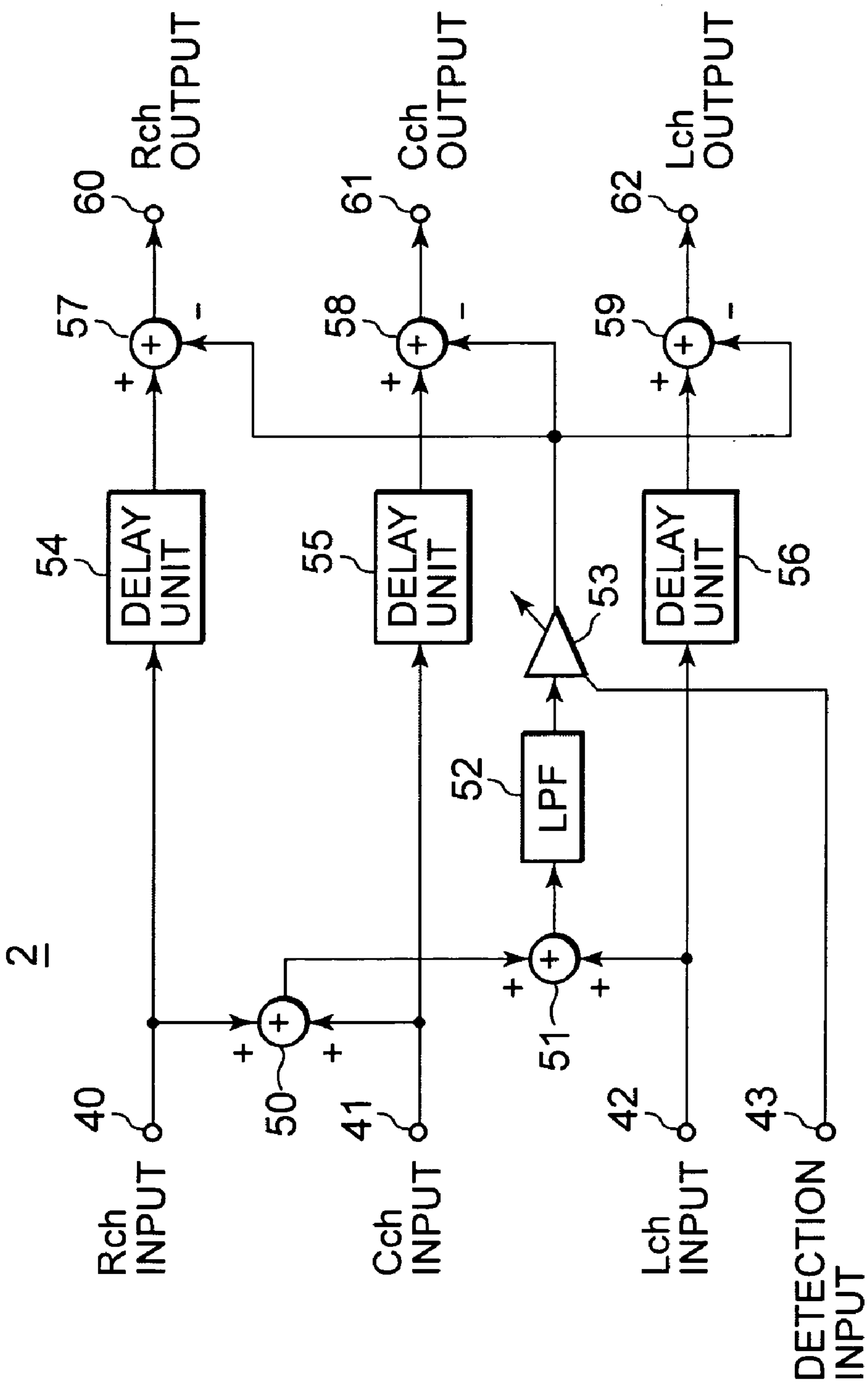
FIG. 2 a diagram showing an embodiment of an automatic wind noise reducing circuit and an automatic wind noise reducing method according to the invention.

FIG. 2 is a block diagram showing an automatic wind noise reducing circuit 2 for further reducing the residual wind noise signal components, which is installed in the subsequent stage of the automatic wind noise reducing circuit 1 of FIG. 1. In other words, the automatic wind noise reducing circuit 2 shown in FIG. 2 receives respective output signals from the automatic wind noise reducing circuit 1 of FIG. 1 and functions to further reduce residual wind noise signal components remaining in respective audio signals supplied thereto.

Input terminals of the automatic wind noise reducing circuit 2 shown in FIG. 2 to be connected with the output terminals of the automatic wind noise reducing circuit 1 shown in FIG. 1 are labeled with the same numerals therebetween.

As shown in FIG. 2, a digital audio signal of Rch supplied from the automatic wind noise reducing circuit 1 of FIG. 1 via terminal 40 is supplied to one of plus terminals of arithmetic unit 50 and to a plus terminal of arithmetic unit 57 via delay unit 54. Further, a digital audio signal of Cch supplied from the automatic wind noise reducing circuit 1 of FIG. 1 via terminal 41 is supplied to the other plus terminal of arithmetic unit 50 and to a plus terminal of arithmetic unit 58 via delay unit 55.

Likewise, a digital audio signal of Lch supplied from the automatic wind noise reducing circuit 1 of FIG. 1 via terminal 42 is supplied to one of plus terminals of arithmetic unit 51 and to a plus terminal of arithmetic unit 59 via delay unit 56.

Further, an added output from arithmetic unit 50 is supplied to the other plus terminal of arithmetic unit 51, and an added output from the arithmetic unit 51 is supplied via LPF 52 to a variable level amplifier 53 which is controlled in a similar way as the variable level amplifiers 32, 33, 34 in the automatic wind noise reducing circuit 1 of FIG. 1 in dependence on the wind noise level detecting signal from terminal 43.

Further, an output from the variable level amplifier 53 is supplied to respective minus terminals of arithmetic units 57, 58 and 59, in which it is subtracted from a digital audio signal of Rch, from a digital audio signal of Cch and from a digital audio signal of Lch supplied respectively to their plus terminals so as to be outputted as Rch output, Cch output and Lch output from respective terminals 60, 61 and 62.

Here, an operation of the automatic wind noise reducing circuit 2 shown in FIG. 2 is described. Using the aforementioned equations (5), (6) and (7), and if the wind noise is maximal, by setting an output/input ratio of the variable level amplifier 53 to be 0.5 times, and further by representing the Rch output, Cch output and Lch output from terminals 60, 61 and 62 to be Rb, Cb and Lb, respectively, a Rch output Rb, a Cch output Cb and a Lch output Lb can be expressed by the following equations (8), (9) and (10), respectively.

$$Rb=Rs+0.5(Rw+Lw+Cw)-0.5(Rw+Lw+Cw)=Rs \quad (8)$$

$$Cb=Cs+0.5(Rw+Lw+Cw)-0.5(Rw+Lw+Cw)=Cs \quad (9)$$

$$Lb=Ls+0.5(Rw+Lw+Cw)-0.5(Rw+Lw+Cw)=Ls \quad (10)$$

Accordingly, all of the residual wind noise signal components Rw, Lw and Cw are canceled so to be able to obtain only audio signals Rs, Cs and Ls. Further, delay units 54, 55 and 56, which compensate for delay components due to LPF 52 on the main line, function to adjust signal timings in arithmetic units 57, 58, 59, thereby further improving the noise reduction effect.

As described hereinabove, the Rch output, Cch output and Lch output outputted from the terminals 60, 61 and 62 are ensured to become audio signals without containing any wind noise signals as they have been canceled, and which, in the case of a video camera, are inputted into a signal processor in its recording system to be recorded in a recording medium such as a tape or the like together with an image signal supplied from the image signal system therein.

Further, as described above, by arranging the automatic wind noise reducing circuits corresponding to three or more channels in a multichannel system, it is enabled readily to execute a wind noise reduction processing in the preceding stage of a directivity calculation operation circuit thereof, thereby enabling to improve the performance and the freedom of the system design. It is needless to mention that this covers two-channels as well.

It should be noted that in FIG. 2 the arithmetic units 50, 51 correspond to the second adder means, the LPF 52 corresponds to the third extraction means, the variable level amplifier 53 corresponds to the second gain control means, and the arithmetic units 57, 58 and 59 correspond to the fourth subtracting means.

Figure 3A:
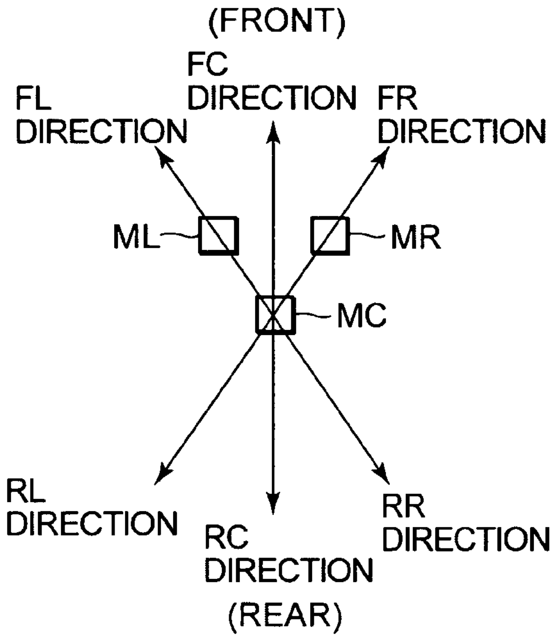
FIGS. 3A and 3B are diagrams showing an example of multichannel audio signal system with a layout of three non-directivity microphones.
Figure 3B:
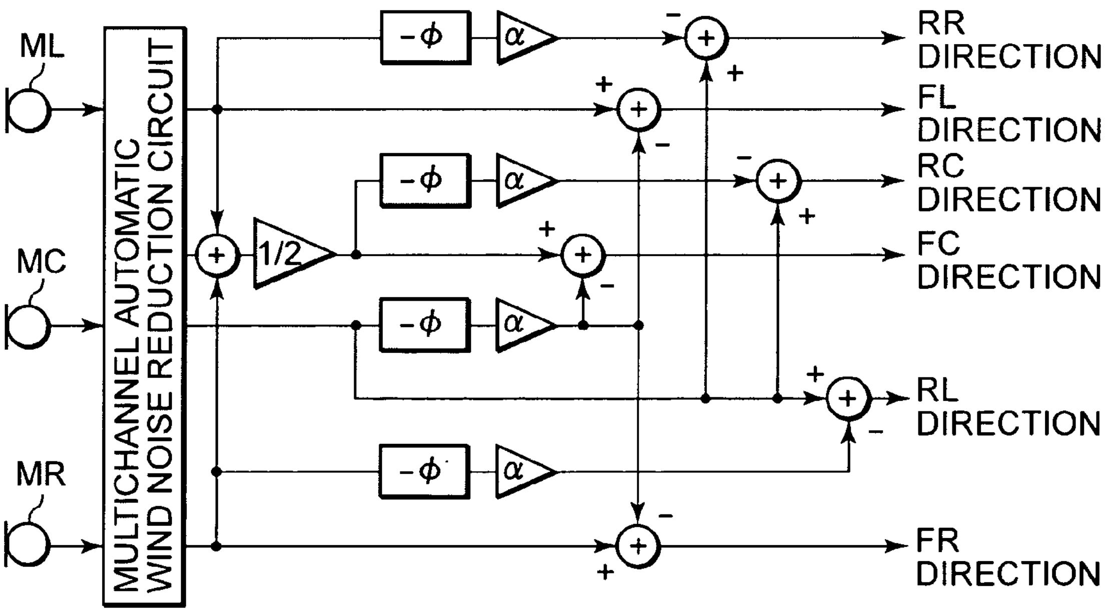

Next, an example of audio signal processing system adapted for a multichannel configuration by utilizing the automatic wind noise reducing circuit and the method thereof according to this present invention is described. FIGS. 3A and 3B are block diagrams showing an example of a multichannel configuration of audio signal processing system having three units of microphones.

The example shows an exemplary case of a multichannel configuration in which three units of non-directivity microphones ML, MC and MR are disposed as shown in FIG. 3A, and which has directivities to audio sounds from a front right direction (referred to as FR direction), a front center direction (referred to as FC direction), a front left direction (referred to as FL direction), a rear left direction (referred to as RL direction), a rear center direction (referred to as RC direction) and a rear right direction (referred to as RR direction).

Each of these three units of microphones ML, MC and MR in this example has a non-directivity characteristic, with the direction of its sound receiving plane being not particularly defined, and respective units of microphones are disposed in a triangle arrangement as shown in FIG. 3A. Assuming respective outputs from respective microphones ML, MC and MR to be L, R and C, then, respective signals to be synthesized in respective directions are expressed by the following equations.

$$\text{Front left direction (FL)}: L-\alpha(C-\phi) \quad (11)$$

$$\text{Front center direction (FC)}: (L+R)/2-\alpha(C-\phi) \quad (12)$$

$$\text{Front right direction (FR)}: R-\alpha(C-\phi) \quad (13)$$

$$\text{Rear left direction (RL)}: C-\alpha(R-\phi) \quad (14)$$

$$\text{Rear center direction (RC)}: C-\alpha((L+R)/2-\phi) \quad (15)$$

$$\text{Rear right direction (RR)}: C-\alpha(L-\phi) \quad (16)$$

where $\alpha$ is a predetermined multiplication coefficient, and $\phi$ is a predetermined delay time.

These directivity patterns show a one-dimensional sound pressure inclination (cardioid) characteristic. As described above, $\alpha$ indicates a multiplication coefficient for flattening its frequency characteristic, and $\phi$ indicates a time delay component corresponding to a physical distance between the microphones disposed as above.

Accordingly, by applying a directivity calculation processing, which is shown in FIG. 3B and already described above, to the outputs from the microphones ML, MR and MC through the automatic wind noise reducing circuits corresponding to respective multi-channels embodying the invention, it is enabled to obtain desired audio signals in multi-channels having reduced the wind noise with respective directivities.

Further, in FIGS. 3A and 3B, it is also possible to generate stereophonic two-channel signals Lch and Rch outputs, respectively, by carrying out arithmetic operations only in the FL and the FR directions. In this case, it is also possible to insert the conventional two-channel automatic wind noise reduction processing of FIG. 5 in the subsequent stage of the directivity calculation processing. By inserting such a processing in the preceding stage of the directivity calculation processing as shown in FIGS. 3A and 3B, an effect which has never been attained before can be achieved.

This is because that since the directivity calculation processing is typically a process for emphasizing a phase shift between signals from respective microphones, the wind noise signals having no correlation therebetween supplied from respective microphones would deteriorates its level if subjected to the directivity calculation operation. Therefore, by inserting the automatic wind noise reduction processing circuit corresponding to the multichannel configuration according to the present invention in the preceding stage of the directivity calculation processing, the deterioration can be prevented.

Although in the description of the aforementioned embodiment, it is described by way of example in which the automatic wind noise reduction processing is applied to the audio signals in three-channels, however, it is not limited thereto, and it may be applied to four-channels or more as well.

In other words, in a case where there exist N number of audio channels (where N is an integer equal to two or more), it is arranged: to select one audio channel from the N number of audio channels without overlapping each other; to add audio signals of the audio channels other than the one audio channel selected so as to obtain N number of added signals; to subtract respective added signals from the corresponding audio signal of the selected audio channel so as to obtain N number of subtraction signals; and to limit frequency bands of the N number of subtraction signals so as to be limited to the band of wind noise signal.

Subsequently, by subtracting corresponding subtraction signals of the N number of subtraction signals, which are subjected to the band limit control, from the respective audio signals of the N number of audio channels after the level adjustment (the gain control) performed, thereby enabling to reduce respective wind noise signals contained in the audio signals of the N number of audio channels.

Furthermore, as described hereinabove, it is enabled to cancel the residual wind noise signal remaining in a desired audio signal and to obtain only the desired audio signal without containing any wind noise signal by subtracting an added signal of the audio signals of the N number of audio channels in which the wind signals have been reduced after limiting a frequency band of the added signal to the frequency band of wind noise signal and adjusting their level, from respective audio signals of the N number of audio channels in which the wind noise signals have been reduced.

Still further, the level adjustment thereof is not limited to those described above in which it is carried out depending on the signal level of the wind noise contained in the audio signal. Alternatively, the level adjustment may be carried out in fixed manner on the basis of an average level of the wind noise signals, or in accordance with a selectable step based on predetermined levels of steps such as strong, medium and weak.

Furthermore, in the description of the aforementioned embodiment, although it is described that the band limit control of the audio signals in the respective channels is to be carried out in the preceding stage of arithmetic units 26, 29, arithmetic units 27, 31 and arithmetic units 28, 30, however, it is not limited thereto, and the band limit thereof may be applied to the output signals of arithmetic units 29, 39 and 31 to the same effect.

Further, in the above-described embodiment, although it is described the automatic wind noise reduction processing applied to the audio signals which are collected by the microphones, it is not limited thereto, and even at the time of reproducing the audio signals recorded in a multichannel configuration in a recording medium, it is possible to apply the automatic wind noise reduction processing thereto as in the cases of FIGS. 1 and 2.

INDUSTRIAL APPLICABILITY

As described heretofore, according to the automatic wind noise reducing circuit and the automatic wind noise reducing method according to the present invention, because it is possible to apply the automatic wind noise reduction processing even to the audio signals having three or more channels, and attain an increased degree of freedom in the system design since the automatic wind noise reduction processing thereof can be inserted in any appropriate place in the circuit, it is possible to cope with a future multichannel configuration.

Further, because the wind noise reduction processing can be subdivided into the two stages as shown in FIGS. 1 and 2, the circuit scale thereof can be selected appropriately depending on the necessity of system.

Still further, because it becomes possible to reduce the wind noise signals before the level thereof deteriorates by enabling to apply the wind noise reduction processing in the preceding stage of the directivity calculation processing such as the stereophonic arithmetic operation, it becomes easy to secure the dynamic range of signals in the subsequent stage, thereby substantially facilitating the system design thereof.

The invention claimed is:

1. An automatic wind noise reducing circuit, characterized by comprising:

N number of audio channels (N is a positive integer equal to or greater than two);

first adder means for adding all of audio signals of N−1 number of audio channels, excluding one audio channel which is selected from the N number of audio channels;

first subtracting means for subtracting an added signal of the first adder means from an audio signal of the selected one of the audio channels, which is not added in the first adder means;

first extracting means for extracting a frequency band component of a wind noise signal with respect to each of the audio signals of the N number of audio channels in a preceding stage of the first adder means and the first subtracting means, or, with respect to an output signal from the first subtracting means in a subsequent stage of the first subtracting means;

first gain control means for controlling a gain of an output signal from the first subtracting means, whose output signal is band-limited by the first extraction means; and second subtracting means for subtracting a signal, whose gain is controlled by the first gain control means, from the audio signal of the selected one of the audio channels, wherein an output signal from the second subtracting means is set as an audio output of the selected one of the audio channels.

2. The automatic wind noise reducing circuit according to claim 1, characterized by comprising:

N sets of the first adder means, the first subtracting means, the first extracting means, the first gain control means and the second subtracting means, the N sets being provided corresponding to the N number of audio channels, wherein the selected one of the audio channels in each set is arranged so as not to overlap to each other.

3. The automatic wind noise reducing circuit according to claim 1, characterized by further comprising:

third subtracting means for obtaining a differential audio signal between arbitrary audio signals among audio signals of the N number of audio channels;

second extracting means for extracting a frequency band component of a wind noise signal from the differential audio signal from the third subtracting means; and detector means, to which an extraction signal from the second extracting means is supplied, for generating a level detecting signal of the wind noise signal, wherein a gain of the first gain control means is variably controlled on the basis of the level detection signal from the detector means.

4. The automatic wind noise reducing circuit according to claim 2, characterized by further comprising:

second adder means for adding all of output signals from the N sets of second subtracting means;

third extracting means, to which a signal from the second adder means is supplied, for extracting a frequency band component of the wind noise signal;

second gain control means for controlling a gain of an output signal from the third extracting means; and N sets of fourth subtracting means for subtracting an output signal of the second gain control means from respective output signals of the N sets of second subtracting means, wherein output signals from the N sets of fourth subtracting means are set as audio signals of the N number of audio channels, respectively.

5. The automatic wind noise reducing circuit according to claim 4, characterized in that:

a gain of the second gain control means is variably controlled on the basis of the level detecting signal from the detector means.

6. An automatic wind noise reducing method, characterized by comprising:

a first adder process for adding all of audio signals of N−1 number of audio channels, excluding one audio channel which is selected from N number of audio channels (N is a positive integer equal to or greater than two);

a first subtraction process for subtracting an added signal of the first adder process from an audio signal of the selected one of the audio channels, which is not added in the first adder process, thereby obtaining a first subtraction signal;

a first extracting process for extracting a frequency band component of a wind noise signal with respect to each of audio signals of the N number of audio channels in a preceding stage of the first adder process and the first subtracting process, or, with respect to the first subtraction signal obtained in the first subtraction process in a subsequent stage of the first subtracting process;

a first gain control process for controlling a gain of the first subtraction signal from the first subtracting process, which is band-limited by the first extraction process; and a second subtracting process for subtracting the first subtraction signal, whose gain is controlled by the first gain control process, from an audio signal of the selected one of the audio channels, thereby obtaining a second subtraction signal, wherein the second subtraction signal is set as an audio output of the selected one of the audio channels.

7. The automatic wind noise reducing method according to claim 6, characterized in that:

in the first adder process, obtaining N number of the added signals, in which different selected ones of the audio channels are used so as not to overlap to each other;

in the first subtracting process, subtracting respective ones of the N number of the added signals obtained in the first adder process from corresponding audio signals of the audio channels, which are selected so as not to overlap each other, thereby obtaining N number of first subtraction signals;

in the first extracting process, performing band-limitation so as to set each of the N number of first subtraction signals as a frequency band component of a wind noise signal;

in the first gain control process, controlling gains of each of the N number of first subtraction signals that are band-limited;

in the second subtracting process, subtracting respective ones of the N number of first subtraction signals, whose gains are controlled in the first gain control process, from corresponding audio signals of the N number of selected audio channels, thereby obtaining N number of second subtraction signals; and setting respective ones of the N number of second subtraction signals as corresponding audio outputs of the N number of audio channels.

8. The automatic wind noise reducing method according to claim 6, characterized by further comprising:

a third subtracting process for obtaining a differential audio signal between arbitrary audio signals among audio signals of the N number of audio channels;

a second extracting process for extracting a frequency band component of a wind noise signal from the differential audio signal from the third subtracting process; and a detector process, to which an extraction signal from the second extracting process is supplied, for generating a level detecting signal of the wind noise signal, wherein a gain of the first gain control process is variably controlled on the basis of the level detection signal from the detection process.

9. The automatic wind noise reducing method according to claim 7, characterized by further comprising:

a second adder process for adding all of the second subtraction signals obtained in the second subtracting process;

a third extracting process for extracting a frequency band component of the wind noise signal from the added signal added and obtained in the second adder process;

a second gain control process for controlling a gain of an extracted signal extracted in the third extracting process; and a fourth subtracting process for subtracting the extracted signal, whose gain is controlled in the second gain control process from respective ones of the N number of second subtraction signals obtained in the second subtracting process, thereby obtaining N number of third subtraction signals, wherein respective ones of the N number of third subtraction signals as audio outputs of the N number of audio channels.

10. The automatic wind noise reducing method according to claim 9, characterized in that:

a gain of the second gain control process is variably controlled on the basis of the level detecting signal from the detection process.

* * * * *